United States Patent [19]

Siejko et al.

[11] 4,214,911

[45] Jul. 29, 1980

[54] METHOD OF PRODUCTION OF CELLULAR CONCRETE

[75] Inventors: Janina Siejko; Hanna Jatymowicz, both of Warsaw, Poland

[73] Assignee: Centralny Osrodek Badawczo-Rozwojowy Przemyslu Betonow "Cebet", Warsaw, Poland

[21] Appl. No.: 920,118

[22] Filed: Jun. 28, 1978

[30] Foreign Application Priority Data

Jul. 5, 1977 [PL] Poland .................... 199385

[51] Int. Cl.² ................ C04B 21/02; C04B 31/06
[52] U.S. Cl. .................... 106/87; 106/98; 106/120
[58] Field of Search .............. 106/87, 98, 89, 100, 106/120

[56] References Cited

U.S. PATENT DOCUMENTS

| 1,782,460 | 11/1930 | Carlson | 106/87 |
| 3,066,031 | 11/1962 | Schifferle | 106/100 |
| 4,040,852 | 8/1977 | Jones | 106/98 |

FOREIGN PATENT DOCUMENTS

1147992  4/1969  United Kingdom .................. 106/87

*Primary Examiner*—James Poer
*Attorney, Agent, or Firm*—Haseltine, Lake & Waters

[57] ABSTRACT

Cellular concrete is produced using, as filler, the sandy fraction of 80–90% $SiO_2$ content which is a waste material from the combustion of brown coal and, as binding agent lime and cement. These raw materials are dry ground and mixed with water having a temperature of about 50° C. and with a pore-producing agent. The thus obtained mixture is poured out into forms.

3 Claims, No Drawings

METHOD OF PRODUCTION OF CELLULAR CONCRETE

The object of the invention is to provide a method for production of cellular concrete with waste materials arising during brown coal combustion.

During the brown coal combustion process in power stations the waste materials segregate into an ashy fraction of 30–50% $SiO_2$ content and a sandy fraction of 80–90% $SiO_2$ content.

A method is known for producing of production of cellular concrete in which the ashy fraction is used as a filler. Ashes are mixed with wet ground sand and the mud obtained in this way is heated to a temperature of about 75° C. and aged during a period of a minimum of 20 hours, then cold water is added, and after the addition of cement and pore producing agents the mass is poured out into forms.

There is also known from Polish Pat. No. 64,161 a method for producing cellular concrete, in which the filler consists of a mixture of 70–90% by weight of the ashy fraction and 10–30% of the sandy fraction of the waste materials from brown coal. A waste material charge comprising the total quantity of the sandy fraction and 20–40% of the ashy fractions is dry ground with the cement and then the remainder of the ashy fraction is added. The mixture of raw materials is mixed with water and heated to a temperature of 45°–50° C. and then pore-producing agents are added.

The method according to the invention consists in that, the sandy fraction of 80–90% $SiO_2$ content is used as the filler and cement and lime are used as the binding agent. These raw materials, after being dry ground in order to activate individual components and to obtain a required size reduction of the raw materials, are mixed with water having a temperature of about 50° C. and with a pore-producing agent and then the process is carried out in the known way.

The advantage of the invention is a substantial simplification of the production technology consisting in an elimination of the complicated and labor-consuming process of aging the mixture of raw materials with water at elevated temperatures. Moreover an economy of the cement is obtained, because waste sand is characterized by an advantageous chemical composition, and in particular by a high $SiO_2$ content and permits obtaining appropriate proportions in the mass of cellular concrete when lime and cement are used as the binding agent.

The total quantity of binding agent used is considerably smaller than the quantity of cement used in known methods. Products made with the cellular concrete produced by the method according to the invention have a resistance about 15% higher in relation to known products and other physical-technical properties are not subjected to changes.

The following example explains in detail the invention without any limitation of its scope: 490 kg of the sandy fraction of waste materials from brown coal combustion and having a $SiO_2$ content of 80% is dry ground with 90 kg of burnt lime and 70 kg of cement. To the obtained mixture 350 l water having a temperature of 50° C. and 400 g of aluminum powder are added and when mixed, the prepared mass is poured out into forms. From the given quantity of components 1 $m^3$ of cellular concrete of having a density in the dry state of 650 kg/$m^3$ is obtained.

We claim:

1. A method for producing cellular concrete comprising the steps of mixing a filler, consisting essentially of a sandy fraction obtained as a waste material from the combustion of brown coal and having an $SiO_2$ content of 80–90%, with a binder consisting essentially of lime and cement, dry grinding the mixture of filler and binder, adding water at a temperature of about 50° C. and a pore-producing agent to said mixture and allowing the resulting mixture to set.

2. The method according to claim 1 wherein the lime is burnt lime.

3. The method according to claim 2 wherein the pore-producing agent is aluminum.

* * * * *